(12) United States Patent
Lindner et al.

(10) Patent No.: US 6,591,943 B1
(45) Date of Patent: Jul. 15, 2003

(54) METHOD FOR LUBRICATING TRANSPORT SYSTEMS OR PARTS THEREOF THE USE OF A LUBRICATING DEVICE FOR CARRYING OUT THE METHOD AND AN APPROPRIATE TRANSPORT SYSTEM WITH A CORRESPONDING LUBRICATING DEVICE

(75) Inventors: Paul Lindner, Henndorf (AT); Ulrich Ruhlemann, Grabenstätt (DE); Helmut Gumpinger, Anger (DE)

(73) Assignee: Bruckner Maschinenbau GmbH, Siegsdorf (DE)

( * ) Notice: Subject to any disclaimer, the term of this patent is extended or adjusted under 35 U.S.C. 154(b) by 0 days.

(21) Appl. No.: 09/857,625

(22) PCT Filed: Dec. 9, 1999

(86) PCT No.: PCT/EP99/09700
§ 371 (c)(1),
(2), (4) Date: Jun. 7, 2001

(87) PCT Pub. No.: WO00/36331
PCT Pub. Date: Jun. 22, 2000

(30) Foreign Application Priority Data

Dec. 13, 1998 (DE) ......................... 198 57 289

(51) Int. Cl.$^7$ ............................................. F16N 13/22
(52) U.S. Cl. ........................................ 184/15.3; 184/3.1
(58) Field of Search ........................... 184/3.1, 3.2, 21, 184/15.3, 7.4, 8, 9

(56) References Cited

U.S. PATENT DOCUMENTS

| | | | | |
|---|---|---|---|---|
| 4,011,927 A | | 3/1977 | Smith | 184/26 |
| 4,346,785 A | * | 8/1982 | Frank | 184/3.1 |
| 4,856,617 A | * | 8/1989 | Lounsberry et al. | 184/3.1 |
| 5,381,874 A | | 1/1995 | Hadank et al. | 184/6.4 |
| 5,394,958 A | * | 3/1995 | Junk et al. | 184/3.1 |
| 5,634,531 A | | 6/1997 | Graf et al. | 184/37 |
| 5,641,037 A | * | 6/1997 | Wise et al. | 184/3.1 |
| 5,722,509 A | * | 3/1998 | Clinger | 184/3.1 |
| 5,769,182 A | | 6/1998 | Parenteau | 184/6.4 |
| 6,250,804 B1 | * | 6/2001 | Hsu et al. | 384/13 |

FOREIGN PATENT DOCUMENTS

| | | |
|---|---|---|
| DE | 22 54 729 | 5/1974 |
| DE | 195 15 036 | 10/1996 |
| EP | 0 419 835 | 4/1991 |
| GB | 2 021 703 | 12/1979 |

* cited by examiner

*Primary Examiner*—Thomas R. Hannon
*Assistant Examiner*—Bradley J. Van Pelt
(74) *Attorney, Agent, or Firm*—Nixon & Vanderhye

(57) ABSTRACT

The invention relates to an improved method for lubricating transport systems or parts thereof, especially for lubricating guideways and rails in elongating systems. The inventive method can be realized in that the lubricant film continuity comprises the equation: X=(lubricating active time/lubricating inactive time)≧100 and/or the lubricant film continuity comprises the equation: Y=(lubricating active time/(lubricating active time+lubricating inactive time)) ≧10%.

19 Claims, 5 Drawing Sheets

METHOD FOR LUBRICATING TRANSPORT SYSTEMS OR PARTS THEREOF THE USE OF A LUBRICATING DEVICE FOR CARRYING OUT THE METHOD AND AN APPROPRIATE TRANSPORT SYSTEM WITH A CORRESPONDING LUBRICATING DEVICE

Method of lubricating transport systems or parts thereof, and also the use of a lubrication arrangement for carrying out the method, and an associated transport system with corresponding lubrication device The invention relates to a method of lubricating transport systems or parts thereof, in particular guideways and rails in stretching units, and also to the use of a lubrication arrangement for carrying out the method and to an associated transport system with corresponding lubrication device.

Lubrication arrangements in which, for example, the running surfaces in transport systems is to be effected by droplet lubrication or oil mist lubrication have already been disclosed. During droplet lubrication, for example, lubricating oil is fed to the machine parts moving against one another in a rolling or sliding manner via arrangements which permit accurate proportioning of the oil quantity per lubricating point. In this case, the oil is fed to the points to be lubricated via a pressure generator or via tanks, oil droplet apparatuses and the like placed above the points to be lubricated. In the process, the quantity is distributed via proportioning valves or metering elements, a specific volume being delivered during each working stroke. In this case, the individual working strokes are separated from one another by idle times, during which no oil is delivered.

U.S. Pat. No. 5,634,531, for example, has disclosed an appropriately electrically controllable automatic lubrication arrangement. A piston is moved forward via an electrically activated screw spindle, and the free-flowing lubricant located in a pressure space is delivered via a discharge opening. In this case, the electric motor for feeding the pressure medium is connected to a control loop which is periodically activated for driving the motor in the above-mentioned sense in order to deliver a next metered quantity of lubricant.

In a central lubrication arrangement for tension chains which has been disclosed by DD 148 356, provision is made for a piston pump to be driven via a motor, this piston pump drawing in lubricant from a tank via a suction line and the lubricant being fed to the corresponding lubricating point via outlets of the piston pump, preferably 6 to 12 outlets for 6 to 12 lubricating points, specifically via droplet indicators. In this case, each droplet indicator is assigned to a corresponding lubricating point or sprays the lubricating oil per stroke of the piston pump to the respectively associated lubricating point, i.e. a sliding surface or a joint pin. The speed of rotation of the piston pump and thus the number of strokes per minute can be firmly established via gear unit or coupling.

Against this background, the object of the present invention is to provide an improved method of lubricating transport systems and parts thereof, in particular corresponding parts of a stretching unit, and also an improved lubrication arrangement and a corresponding transport system with improved lubrication, in particular an improved method or an arrangement to the effect that a further reduction in the lubricant consumption becomes possible.

However, in all the methods disclosed by the prior art, it has now been found that, when the lubricant is being fed (through bores in the rail, for example, in the case of stretching units), the lubricant droplets produced, which discharge as a result, have a certain minimum size. As soon as a part to be lubricated which comes into contact with the oil droplet is moved over this lubricant, for example a running roller or a sliding element in the case of a stretching unit, most of the droplet volume is displaced or thrown off laterally and can therefore no longer come into effect. The present technical limit for metering is around 10 mm$^3$ per metering point. At present, smaller quantities cannot be metered in this form. This is because the best lubricant [sic] systems up to now work with a pneumatic delivery in a pulsed operation at a comparatively long time interval, in which case the pulsing appears necessary in order to exceed a minimum pressure in order to actually deliver a very small droplet. If the pressure were to be reduced even further during the pulsing, the pressure, due to internal friction values, would be reduced in the lubricant passage system to such an extent that no more droplets would be delivered at the lubricant openings.

In contrast, the invention proposes continuous lubricant delivery and feed, i.e. with a marked reduction in the idle times provided in the prior art or even completely avoiding idle times in a cycle. According to the invention, a short interruption in the lubricant feed is only necessary when a lubricant pressure space has been completely emptied while using a corresponding lubrication arrangement, and the piston or pistons have to be briefly retracted and the tank has to be filled again.

In a preferred embodiment of the invention, the continuous lubricant delivery according to the invention is characterized in particular by the fact that the continuous guidance is nonetheless carried out directly, thus obviating the need for additional transfer systems which ultimately effect the lubrication and which are described in DE 22 54 729 B2, for example, as being necessary.

The quite fundamental and substantial difference between the method according to the invention and the prior art results just from the fact that, for example, the quotient of the active lubricating time and the idle or reloading time of a lubricant volume which is filled with lubricant and can be refilled with lubricant again after it has been emptied can amount to a value X=0.25 in the prior art, it being possible in the lubrication according to the invention for this figure to be greater not only by a factor of 10, 100 or 1000, for example, but even to be 5000 times and more greater, for example.

Marked advantages compared to previous methods are achieved by this method according to the invention. On the one hand, a drastic reduction in the lubricant consumption is obtained. Furthermore, if it is considered that very expensive special temperature-resistant oils have to be used in many installations, in particular in film stretching units, the financial savings can be seen immediately. On the other hand, the reduction in the lubricant consumption results in the quite fundamental further advantage that lubricant particles which are thrown off can thus cause less contamination and impairment, and thus the quality and cleanliness of the product to be manufactured are markedly improved. This is also in particular very important in the manufacture of plastic film.

It is also mentioned, only for the sake of completeness, that the spray lubrication known in principle in the prior art leads to no improvement in this respect, since the lubricant, in this case too, is not applied exactly to the lubricating point, lubricant is consequently likewise wasted, and in addition, again especially in the manufacture of plastic film, the plastic film is greatly contaminated by the mist of the discharging lubricant, this mist being finely distributed in the air.

An arrangement which is suitable in particular for continuous lubricant discharge over a long time is proposed in order to carry out the method.

The invention is described in more detail below with reference to drawings, in which, in particular:

Figure 1:
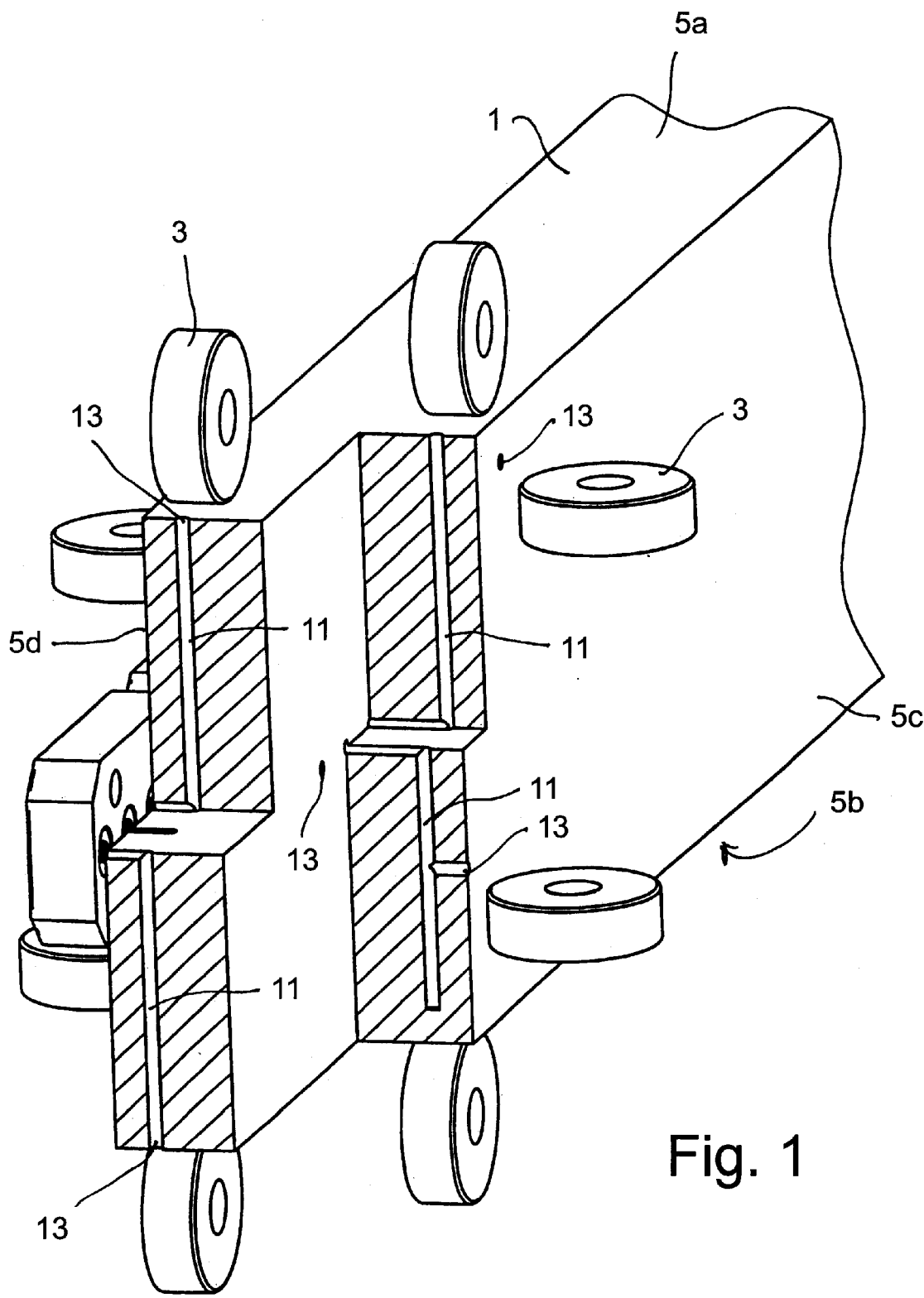
FIG. 1 shows a schematic cross section through a rail to be lubricated, as can be used in a film stretching unit.

A stretching unit, for example, as disclosed in prior Publication DE195 15 036 A1 includes the rail 1 on which running surfaces 5a and 5d wheels 3 run. The wheels are attached to a tenter clip 50 for stretching material such as plastic thumb between the transversely opposed stretching units 48. Reference may be had to the prior Publication DE195 15 036 A1 for details of the stretching unit.

Shown in FIG. 1 is a schematic cross section of a guide rail 1 on which a tenter-clip carriage (only intimated) can be moved longitudinally. Of the tenter-clip carriage, only several pairs of running wheels 3 are shown for the purpose of schematic illustration, these pairs of running wheels rolling, for example, firstly on the upper running surface 5a, the opposite lower running surface 5b, the running surface 5c on the right in FIG. 1, and the opposite running surface 5d. The exemplary embodiment therefore deals with a "monorail", in which case the running wheels 3 overlap the running surfaces 5a to 5d, in each case opposite one another in pairs, and roll on them. A corresponding tenter-clip carriage and a corresponding drive arrangement, for example, is prior publication DE 195 15 036 A1, the full disclosure contents of which are referred to. Such guide rails 1 are used, for example, in the manufacture of plastic films in sequential stretching units (while carrying out a transverse stretching step and a subsequent longitudinal stretching step or vice versa) or else in simultaneous stretching units with simultaneous stretching of a plastic film in the longitudinal and transverse directions. Rollers and also sliding elements may serve as guide elements for the tenter-clip carriage.

Shown in the schematic cross-sectional representation are lubricant bores or passages 11 which are provided, for example, in the rail body and via which the lubricant is delivered to discharge openings 13 on the rail running surfaces 5a to 5d to be lubricated. The discharge openings 13 provided on the individual rail running surfaces are arranged at an appropriate height and at appropriate distances from one another in order to achieve adequate lubrication. Only some of these discharge openings are shown in FIG. 1.

Figure 2:
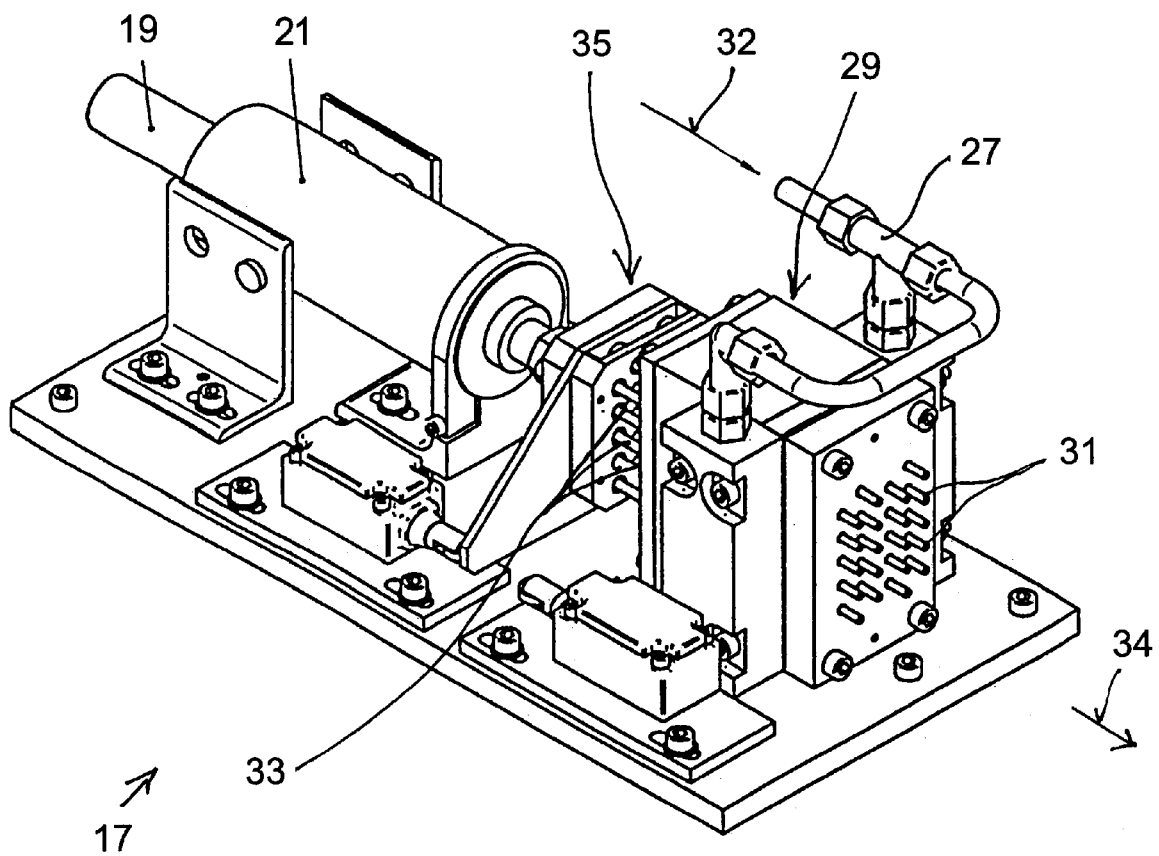
FIG. 2 shows a schematic perspective representation of a lubrication arrangement.

The lubricant is fed, for example, via a lubrication arrangement 17 which is reproduced schematically in FIG. 2 and comprises a drive device, preferably in the form of an electric motor 19, and a displacing unit 21, preferably in the form of a high-ratio gear unit. One or more pistons are moved continuously forward by the motor and the displacing unit 21 together with a linear unit, for example in the form of a spindle-stroke unit, as a result of which lubricant or oil is forced out of the associated cylinder or cylinders. Schematically shown in FIG. 2 is an intake line 27 which leads to a lubricant tank (not shown in any more detail) and to a cylinder distribution device 29, on which a multiplicity of discharge lines 31 are provided. The intake of lubricant is effected in the direction of the arrow 32.

A number of pistons 33 corresponding to the number of discharge lines 31 are located in the interior of the cylinder distribution device 29, and these pistons 33, in the exemplary embodiment according to FIG. 2, are all connected to and are driven by a piston plate 35 which is connected via the motor and the gear unit and can be moved slowly forward. By slow feed movement of the piston plate 35, in the pistons 33 are moved slowly forward in corresponding cylinders or bores (which form the cylinders) located in the cylinder distribution device 29, so that a lubricant quantity corresponding to the cylinder volume is delivered slowly from the discharge lines 31 during the continuous driving and is delivered via the feed lines (not shown in any more detail) according to the arrow 34 to the plurality of discharge openings 13 shown in FIG. 1.

In this case, the motor is driven continuously in order to obtain a continuous delivery of lubricant. The lubricating film is not interrupted during the entire reciprocating period of the piston or pistons in order to produce the continuous delivery. The delivery of the lubricant is only interrupted by the recharging of the cylinder distribution device 29, which is designed like a central unit.

The construction may be such that, for example, the lubricant quantities per month reproduced below can be supplied continuously with lubricants in accordance with the metering points indicated, the times when recharging of the central unit with lubricant becomes necessary against also being indicated.

| Quantity of liters per month | Number of metering points | Time after which first recharging becomes necessary |
|---|---|---|
| 4.0 | 20 | 2.1 hours |
| 2.0 | 20 | 4.25 hours |
| 1.0 | 20 | 8.5 hours |
| 0.5 | 20 | 17 hours |
| 0.25 | 20 | 34 hours |

It can be seen just from the above table that the cleanliness of the entire system can be markedly increased, because the oil or lubricant quantity can be markedly reduced compared with conventional solutions, if only as much lubricant or oil is offered as is actually consumed at each instant.

Figure 3:
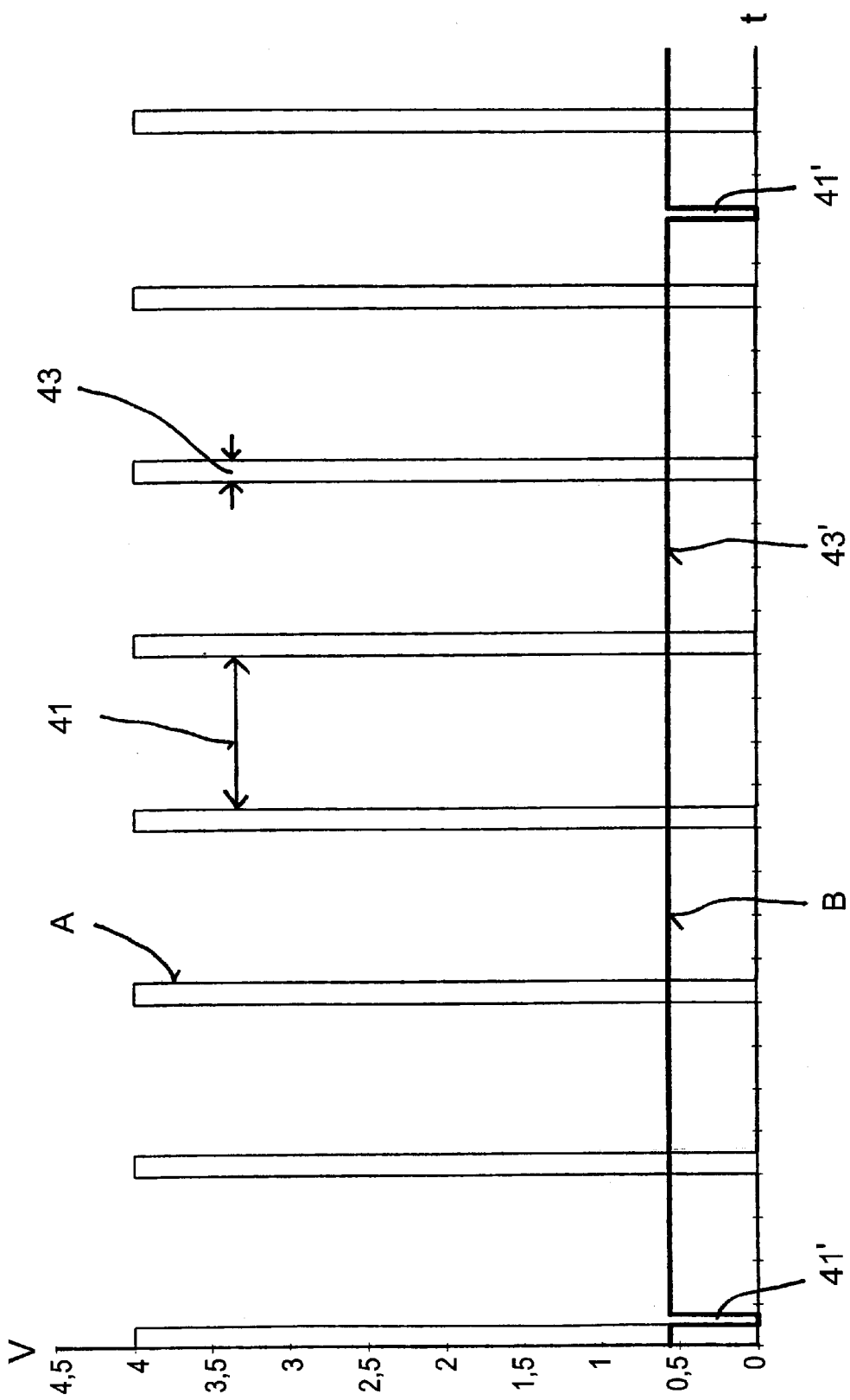
FIG. 3 shows a diagram for illustrating the functioning of the lubricating method according to the invention compared to a method known from the prior art.

The diagram according to FIG. 3 illustrates the differences between the continuous discharge according to the invention and the prior art. In the diagram according to FIG. 3, the time t is shown on the horizontal axis and the relative consumption V per unit of time is shown on the Y-axis. In this case, the curve A represents the lubricant consumption and the time-dependent metering of the lubricant in a solution disclosed by the prior art, whereas the curve B reproduces the solution according to the invention with a continuous lubricant discharge.

Whereas in the prior art the lubricant delivery device has in each case been switched on only for a comparatively short delivery time 43 (for example by an electric motor drive), while maintaining comparatively long idle times 41, in order to produce and deliver a lubricant droplet, the lubricant curve B reproduced according to the invention shows that the lubricant is delivered continuously over time; that is to say, the delivery time 43' represents a long continuous period, and the idle time 41' is briefly required only once inasmuch as brief refilling is necessary after emptying of a lubricant pressure space.

The conditions which can be seen from the diagram according to FIG. 3 may also be illustrated by the following considerations.

To this end, the designation "lubricant film continuity" serves as a distinguishing feature and is defined as follows:

$$\text{Lubricating film continuity}: X = \frac{\text{Active lubricating time}}{\text{Inactive lubricating time}}$$

The inactive lubricating time therefore represents the entire idle time during which no lubrication takes place. It basically comprises the idle times 41' between two lubricating pulses and also the idle times possibly still required at greater time intervals for refilling a lubricant tank. In the solution according to the invention in accordance with curve B, the inactive lubricating time consists only of the idle time 41', which is required at greater time intervals for refilling the lubricant delivery device, that is to say, in the case of the delivery device according to FIG. 2, for returning the piston unit to the initial position while drawing in fresh lubricant.

For a delivery quantity of, for example, 0.51 per month distributed over 20 metering points, this means, for example, that, according to the invention, the active lubricating time between two recharging or idle times 41' depicted in FIG. 3 may be, for example, 1020 min, the recharging and idle time 41' being only 1 min. In contrast, in the prior art, in the same period, the active lubricating time would only be 204 min and the idle time would be 816 min. Accordingly, in the period to be compared, the active lubricating time is obtained from the sum of the active lubricating times 43 according to curve A in FIG. 3, the idle or inactive lubricating times being formed from the sum of the idle times 41. In this case, the ratio of active lubricating time to idle time in the prior art corresponding to the values 204:816 corresponds to the ratio of, for example, 15 s:60 s, that is to say the ratio between the time interval for the active lubricating time 43 and the length of the time unit for the idle time 41. Generally speaking, for the prior art on the one hand and for the invention on the other hand, the following values are obtained for a value X for the lubricating film continuity:

$$\text{Previously known}: X = \frac{\text{Active lubricating time}}{\text{Inactive lubricating time}} = \frac{204 \text{ min}}{816 \text{ min}} = 0.25$$

$$\text{Invention}: X = \frac{\text{Active lubricating time}}{\text{Inactive lubricating time}} = \frac{1020 \text{ min}}{1 \text{ min}} = 1020$$

The higher the value X for the lubricating film continuity, the smaller is the proportion of lubricating film interruption.

By correct selection of the lubricating quantity and piston dimensions and piston stroke, the value X can be also be increased without any problem not only above 1000, 10,000, 100,000 but even above 1,000,000, for example right up to 2,000,000.

However, a lubricating film continuity Y which may be specified, for example, in % may also serve as a distinguishing feature between the invention and the prior art:

$$Y = \frac{\text{Active lubricating time}}{\text{Active lubricating time} + \text{inactive lubricating time}}$$

For example, for typical values according to the prior art, this results in:

$$Y = \frac{\text{Active lubricating time}}{\text{Active lubricating time} + \text{inactive lubricating time}}$$

$$Y = \frac{204 \text{ min}}{816 \text{ min} + 204 \text{ min}} = 0.2 \Rightarrow 20\%$$

The same value of 20% is also obtained if the ratio between the duration for an active lubricating time 43 and the inactive time 41 plus the active lubricating duration 43 is formed (namely 15 s /(15 s+60 s)=20%).

When the invention is used, the following values are obtained:

$$Y = \frac{\text{Active lubricating time}}{\text{Active lubricating time} + \text{inactive lubricating time}}$$

$$Y = \frac{1020 \text{ min}}{1020 \text{ min} + 1 \text{ min}} = 0.999 \Rightarrow 99.9\%$$

It is therefore found that the value Y according to the invention can be increased above 20% without any problem, that is to say also above 30%, 40%, 50%, 60%, 70% or even 80% and 90% without any problem. The arithmetical example shows that values even above 99% up to just below the 100% mark can be realized. The closer the value Y is to 100%, the smaller is the proportion of the time which is interrupted during the lubricating film feed.

Figure 4:
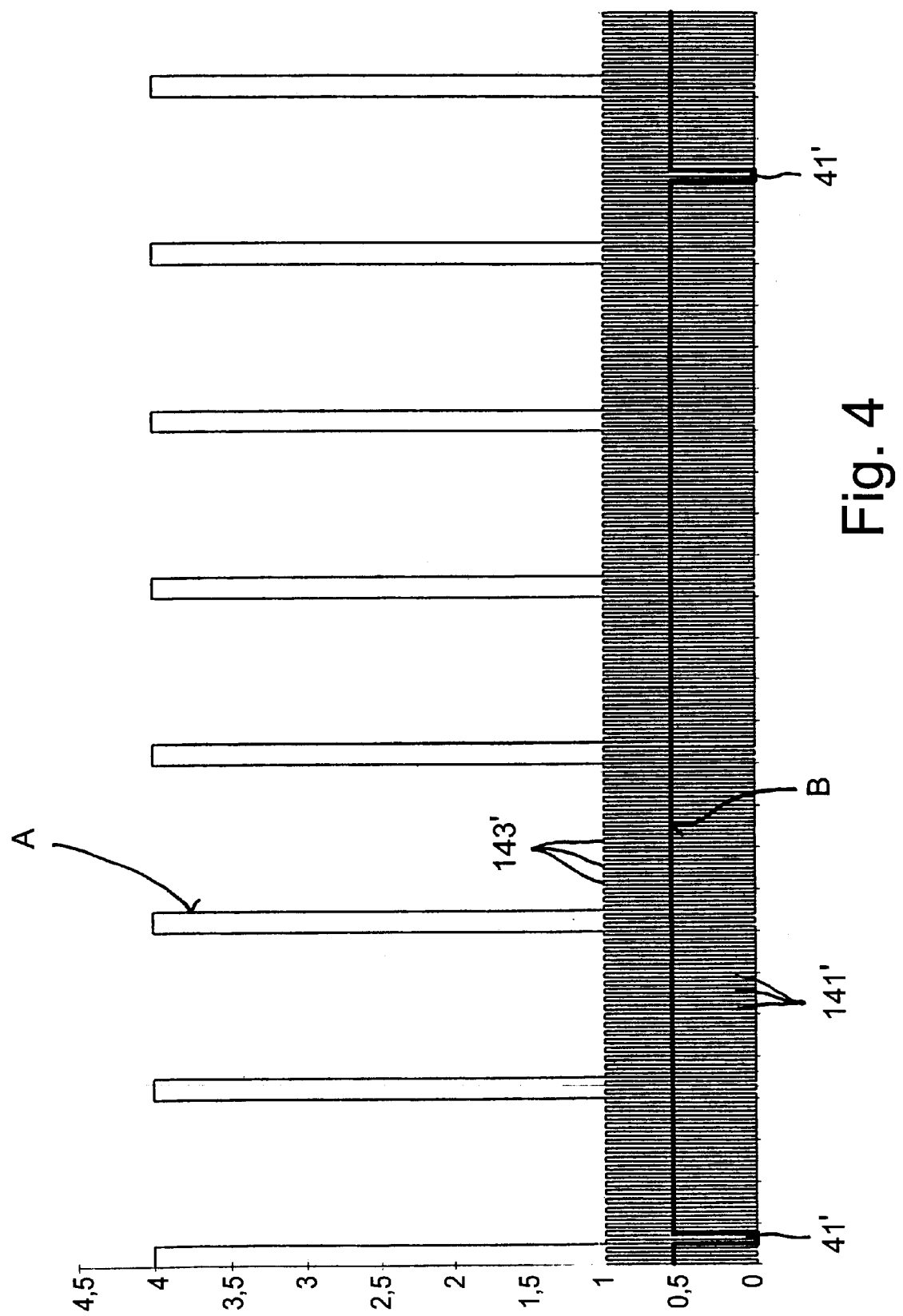
FIG. 4 shows a further diagram with regard to a modified exemplary embodiment.
Figure 5:
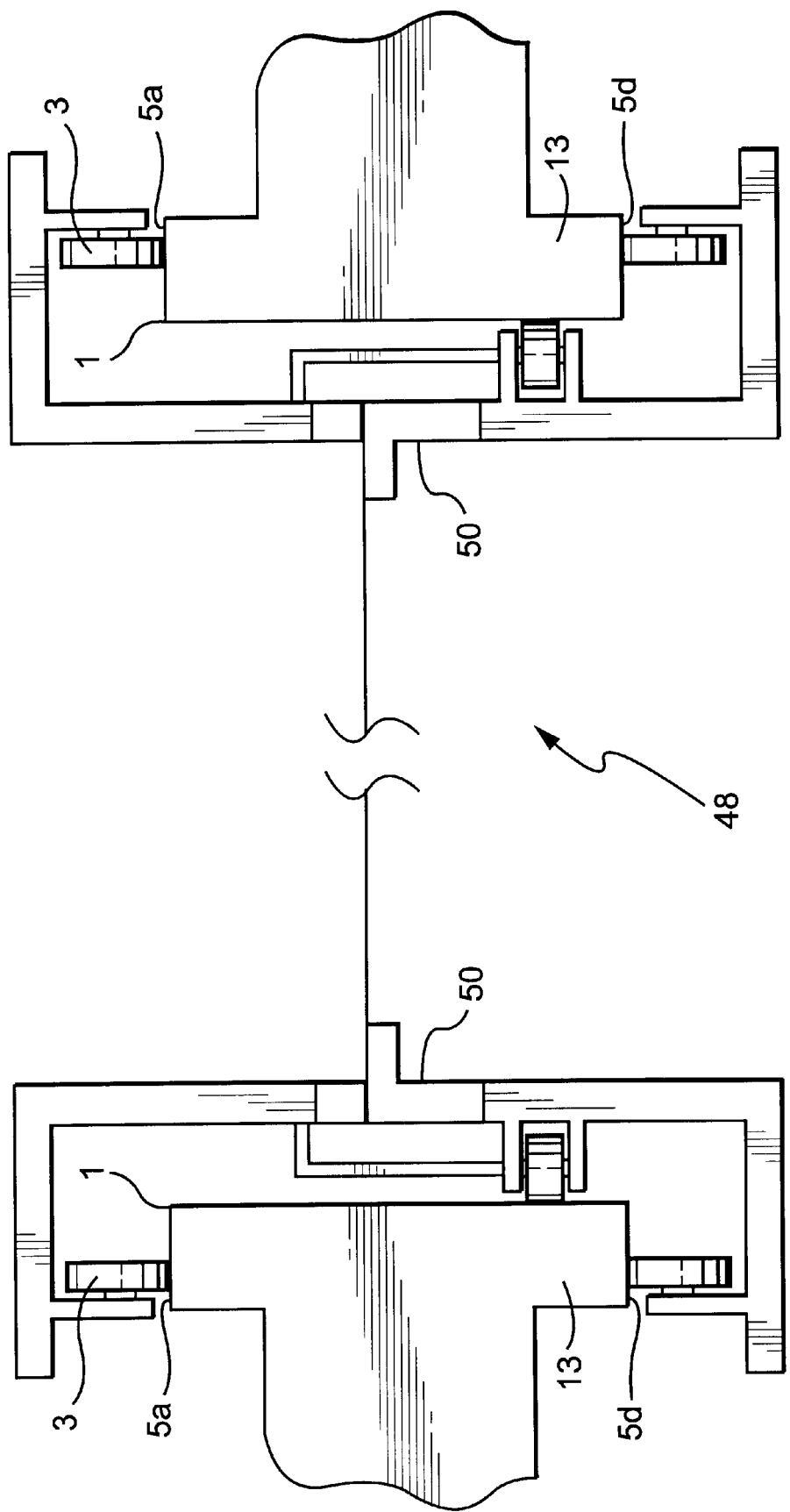
FIG. 5 is a schematic illustration of a stretching unit in which the lubricating system of the present invention may be utilized.

With reference to the diagram according to FIG. 4, it is shown, only for the sake of completeness, that the solution according to the invention can also be at least more or less realized if, in deviation from the solutions according to the prior art (curve A in FIG. 4), the delivery times 143' are markedly and drastically increased compared to the idle and inactive times 141', by the lubricating film feed being carried out at a high cycle rate and with idle times which are as short as possible. This involves a virtually continuous lubricant feed even if the feed is carried out cyclically, as long as the advantages according to the invention can always be achieved, in particular for low lubricant viscosities, on account of the higher frequency or cycle rate compared to the prior art.

What is claimed is:

1. A method of lubricating a guideway having a running surface, a plurality of lubricating openings along the guideway running surface and passages along the guideway in communication with the openings, comprising the steps of:
    (a) supplying a lubricant along the passages for discharge onto the guideway surface through said discharge openings; and
    (b) delivering the lubricant through the discharge openings as a function of the continuity of lubricant film delivery over time wherein the lubricant film continuity is:

$$X = \frac{\text{Active Lubricating Time}}{\text{Inactive Lubricating Time}} \geq 100$$

2. A method according to claim 1 wherein the lubricant film continuity is X >1000.

3. A method according to claim 1 wherein lubricant film continuity X is ≧10,000.

4. A method according to claim 1 wherein lubricant film continuity X is ≧100,000.

5. A method according to claim 1, wherein lubricant film continuity X is 1,000,000.

6. A method according to claim 1 including delivering the lubricant through the discharge openings directly to points along the guideway surface to be lubricated.

7. A method according to claim 6 including applying steps (a) and (b) to lubricate guideways and guiderails in stretching units.

8. A method according to claim 1 including a drive unit and a displacing unit connected downstream of said drive unit, said displacing unit having one or more pistons and including the steps of moving the pistons linearly forwardly to produce a substantially continuous lubricant feed.

9. A method according to claim 8 including applying steps (a) and (b) to lubricate guideways and guiderails in stretching units.

10. A method according to claim 9 including spacing the discharge openings from one another along the running surfaces to be lubricated.

11. A method of lubricating a guideway having a running surface, a plurality of lubricating openings along the guideway running surface and passages along the guideway in communication with the openings, comprising the steps of:

(a) supplying a lubricant along the passages for discharge onto the guideway surface through said discharge openings; and (b) delivering the lubricant through the discharge openings as a function of the continuity of lubricant film delivery over time wherein the lubricant film continuity is expressed as a percentage Y wherein:

$$Y = \frac{\text{Active Lubricating Time}}{\text{Active Lubricating Time} + \text{Inactive Lubricating Time}} \geq 30\%$$

12. A method according to claim 11 wherein the lubricant film continuity expressed as a percentage Y is ≧40%.

13. A method according to claim 11 wherein the lubricant film continuity expressed as a percentage Y is ≧50%.

14. A method according to claim 11 wherein the lubricant film continuity expressed as a percentage Y is ≧60%.

15. A method according to claim 11 wherein the lubricant film continuity expressed as a percentage Y is ≧70%.

16. A method according to claim 11 wherein the lubricant film continuity expressed as a percentage Y is ≧80%.

17. A method according to claim 11 wherein the lubricant film continuity expressed as a percentage Y is ≧90%.

18. A method according to claim 11 wherein the lubricating film continuity Y expressed as a percentage is ≧95%.

19. A method according to claim 11 wherein the lubricating film continuity Y expressed as a percentage is ≧99%.

* * * * *